United States Patent
Tunc et al.

(10) Patent No.: US 10,353,358 B2
(45) Date of Patent: Jul. 16, 2019

(54) RIG CONTROL SYSTEM

(71) Applicant: Schlumberger Technology Corporation, Sugar Land, TX (US)

(72) Inventors: Gokturk Tunc, Houston, TX (US); Shunfeng Zheng, Katy, TX (US)

(73) Assignee: SCHLUMBERG TECHNOLOGY CORPORATION, Sugar Land, TX (US)

( * ) Notice: Subject to any disclaimer, the term of this patent is extended or adjusted under 35 U.S.C. 154(b) by 514 days.

(21) Appl. No.: 14/788,124

(22) Filed: Jun. 30, 2015

(65) Prior Publication Data

US 2016/0290119 A1 Oct. 6, 2016

Related U.S. Application Data

(60) Provisional application No. 62/143,442, filed on Apr. 6, 2015.

(51) Int. Cl.
| | |
|---|---|
| G05B 15/02 | (2006.01) |
| E21B 44/00 | (2006.01) |
| G05B 19/042 | (2006.01) |
| E21B 43/30 | (2006.01) |
| E21B 19/08 | (2006.01) |
| E21B 7/20 | (2006.01) |

(52) U.S. Cl.
CPC .............. *G05B 15/02* (2013.01); *E21B 44/00* (2013.01); *G05B 19/0421* (2013.01)

(58) Field of Classification Search
USPC ...................................................... 700/275
See application file for complete search history.

(56) References Cited

U.S. PATENT DOCUMENTS

| | | | |
|---|---|---|---|
| 2004/0153245 A1 | 8/2004 | Womer et al. | |
| 2008/0173480 A1 | 7/2008 | Annaiyappa et al. | |
| 2010/0114493 A1* | 5/2010 | Vestal | E21B 44/00 |
| | | | 702/9 |
| 2010/0147589 A1* | 6/2010 | Wingky | E21B 44/00 |
| | | | 175/40 |
| 2013/0231781 A1 | 9/2013 | Chapman | |
| 2014/0340990 A1 | 11/2014 | Chen et al. | |
| 2015/0053483 A1 | 2/2015 | Mebane, III | |
| 2016/0041803 A1* | 2/2016 | Markov | A01B 69/001 |
| | | | 701/48 |

FOREIGN PATENT DOCUMENTS

WO 2014151453 A1 9/2014

* cited by examiner

*Primary Examiner* — Michael J Brown
(74) *Attorney, Agent, or Firm* — Rachel Greene

(57) ABSTRACT

Systems and methods for controlling a drilling rig. The system includes a first layer including a plurality of subsystem controllers coupled with a plurality of rig subsystems, the plurality of subsystem controllers being configured to control operating parameters of the plurality of rig subsystems. The system also includes a second layer configured to receive information from the first layer based on an operation of the plurality of rig subsystems, and to provide control of the plurality of rig subsystems. The system further includes a third layer configured to execute one or more process applications and to provide a task-based command to the second layer.

5 Claims, 10 Drawing Sheets

RIG CONTROL SYSTEM

CROSS-REFERENCE TO RELATED APPLICATIONS

This application claims priority to U.S. Provisional Patent Application Ser. No. 62/143,442, which was filed on Apr. 6, 2015 and is incorporated by reference herein in its entirety.

BACKGROUND

Rig control systems may be built by rig control system manufacturers that are primarily concerned about safe operation of rig equipment. These rig control systems are installed on drilling rigs, which are usually operated by rig contractors. During drilling operation, several drilling service providers may come to the rig to perform various drilling operations, such as directional drilling, measurements and loggings, and/or drilling optimizations. These service providers typically bring their own acquisition and/or control systems as part of their computing resources. In order to improve efficiency and/or safety of drilling operations, the computing resources from the drilling service providers may interact with rig control system.

Communications between the service providers' computing resources and the rig control system may be based on non-deterministic and high latency middleware. Further, data acquired by different systems from different service providers may not align properly in time or depth. This may limit the capability of additional control algorithms to be implemented in the existing control system. In addition, sensor data obtained in the rig control system might not be exposed to these third party service providers' computing resources, creating hardware redundancy and/or conflicting measurements for the operation.

SUMMARY

Embodiments of the disclosure may provide a system for controlling a drilling rig. The system includes a first layer including a plurality of subsystem controllers coupled with a plurality of rig subsystems, the plurality of subsystem controllers being configured to control operating parameters of the plurality of rig subsystems. The system also includes a second layer configured to receive information from the first layer based on an operation of the plurality of rig subsystems, and to provide control of the plurality of rig subsystems. The system further includes an third layer configured to execute one or more process applications and to provide a task-based command to the second layer.

Embodiments of the disclosure may also provide a system for controlling a drilling rig. The system includes a plurality of first controllers each configured to control an operating parameter of a respective rig subsystem of a plurality of rig subsystems of the drilling rig and to receive sensor data therefrom, wherein the plurality of first controllers are configured to provide a feedback loop for executing a command related to the operating parameter. The system further includes a second controller configured to receive sensor data from the plurality of first controllers and to coordinate control of the plurality of rig subsystems.

Embodiments of the disclosure may additionally provide a method for controlling a drilling rig. The method includes controlling operating parameters of a plurality of rig subsystems using a plurality of subsystem controllers in a first layer. Each of the plurality of subsystem controllers controls one of the plurality of rig subsystems independently of the others of the plurality of subsystem controllers. The method also includes generating feedback information using the first layer, based on the operation of the plurality of rig subsystems, and receiving the feedback information from the first layer, at a second layer. The method additionally includes coordinating operation of the plurality of rig subsystems using the second layer.

The foregoing summary is provided to introduce a subset of the features discussed in greater detail below. Thus, this summary should not be considered exhaustive or limiting on the disclosed embodiments or the appended claims.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to specific embodiments illustrated in the accompanying drawings and figures. In the following detailed description, numerous specific details are set forth in order to provide a thorough understanding of the invention. However, it will be apparent to one of ordinary skill in the art that embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object or step, and, similarly, a second object could be termed a first object or step, without departing from the scope of the present disclosure.

The terminology used in the description of the invention herein is for the purpose of describing particular embodiments only and is not intended to be limiting. As used in the description of the invention and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Figure 1:
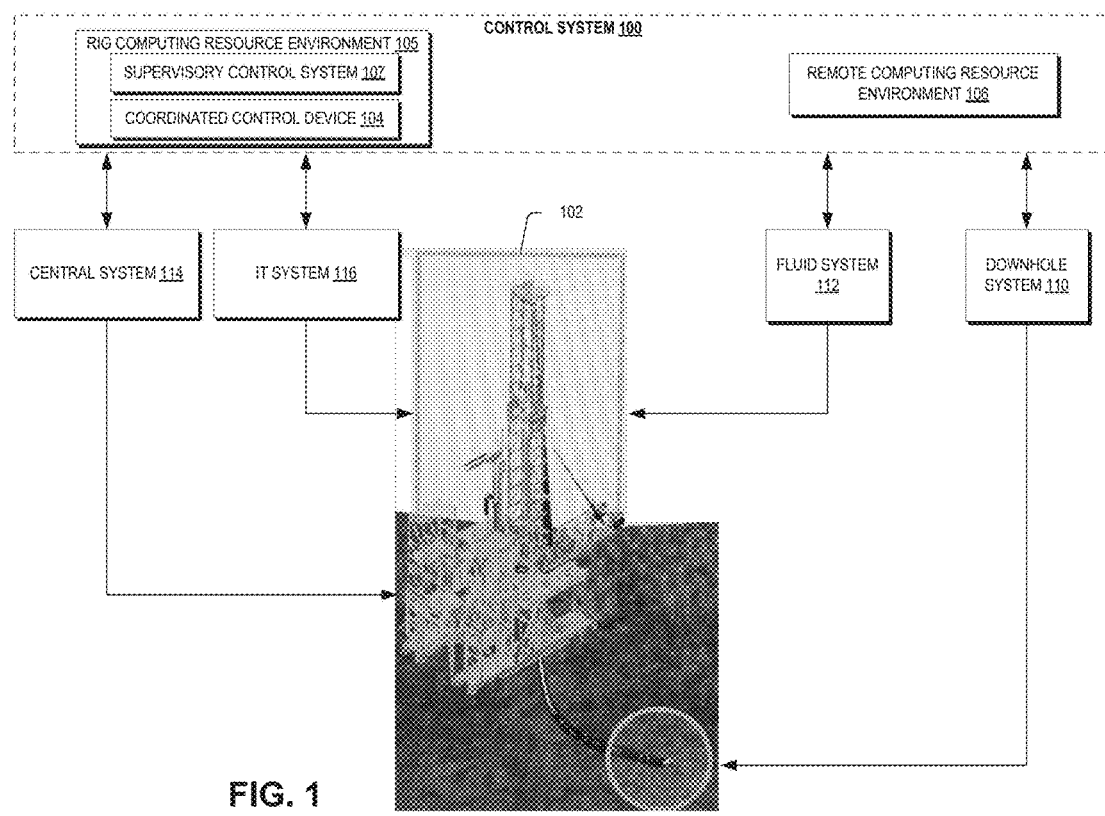
FIG. 1 illustrates a schematic view of a drilling rig and a control system, according to an embodiment.

FIG. 1 illustrates a conceptual, schematic view of a control system 100 for a drilling rig 102, according to an embodiment. The control system 100 may include a rig computing resource environment 105, which may be located onsite at the drilling rig 102 and, in some embodiments, may have a coordinated control device 104. The control system 100 may also provide a supervisory control system 107. In some embodiments, the control system 100 may include a remote computing resource environment 106, which may be located offsite from the drilling rig 102.

The remote computing resource environment 106 may include computing resources locating offsite from the drilling rig 102 and accessible over a network. A "cloud" computing environment is one example of a remote computing resource. The cloud computing environment may communicate with the rig computing resource environment 105 via a network connection (e.g., a WAN or LAN connection). In some embodiments, the remote computing resource environment 106 may be at least partially located onsite, e.g., allowing control of various aspects of the drilling rig 102 onsite through the remote computing resource environment 105 (e.g., via mobile devices). Accordingly, "remote" should not be limited to any particular distance away from the drilling rig 102.

Further, the drilling rig 102 may include various systems with different sensors and equipment for performing operations of the drilling rig 102, and may be monitored and controlled via the control system 100, e.g., the rig computing resource environment 105. Additionally, the rig computing resource environment 105 may provide for secured access to rig data to facilitate onsite and offsite user devices monitoring the rig, sending control processes to the rig, and the like.

Various example systems of the drilling rig 102 are depicted in FIG. 1. For example, the drilling rig 102 may include a downhole system 110, a fluid system 112, and a central system 114. These systems 110, 112, 114 may also be examples of "subsystems" of the drilling rig 102, as described herein. In some embodiments, the drilling rig 102 may include an information technology (IT) system 116. The downhole system 110 may include, for example, a bottom-hole assembly (BHA), mud motors, sensors, etc. disposed along the drill string, and/or other drilling equipment configured to be deployed into the wellbore. Accordingly, the downhole system 110 may refer to tools disposed in the wellbore, e.g., as part of the drill string used to drill the well.

The fluid system 112 may include, for example, drilling mud, pumps, valves, cement, mud-loading equipment, mud-management equipment, pressure-management equipment, separators, and other fluids equipment. Accordingly, the fluid system 112 may perform fluid operations of the drilling rig 102.

The central system 114 may include a hoisting and rotating platform, top drives, rotary tables, kellys, drawworks, pumps, generators, tubular handling equipment, derricks, masts, substructures, and other suitable equipment. Accordingly, the central system 114 may perform power generation, hoisting, and rotating operations of the drilling rig 102, and serve as a support platform for drilling equipment and staging ground for rig operation, such as connection make up, etc. The IT system 116 may include software, computers, and other IT equipment for implementing IT operations of the drilling rig 102.

The control system 100, e.g., via the coordinated control device 104 of the rig computing resource environment 105, may monitor sensors from multiple systems of the drilling rig 102 and provide control commands to multiple systems of the drilling rig 102, such that sensor data from multiple systems may be used to provide control commands to the different systems of the drilling rig 102. For example, the system 100 may collect temporally and depth aligned surface data and downhole data from the drilling rig 102 and store the collected data for access onsite at the drilling rig 102 or offsite via the rig computing resource environment 105. Thus, the system 100 may provide monitoring capability. Additionally, the control system 100 may include supervisory control via the supervisory control system 107.

In some embodiments, one or more of the downhole system 110, fluid system 112, and/or central system 114 may be manufactured and/or operated by different vendors. In such an embodiment, certain systems may not be capable of unified control (e.g., due to different protocols, restrictions on control permissions, safety concerns for different control systems, etc.). An embodiment of the control system 100 that is unified, may, however, provide control over the drilling rig 102 and its related systems (e.g., the downhole system 110, fluid system 112, and/or central system 114, etc.). Further, the downhole system 110 may include one or a plurality of downhole systems. Likewise, fluid system 112, and central system 114 may contain one or a plurality of fluid systems and central systems, respectively.

In addition, the coordinated control device 104 may interact with the user device(s) (e.g., human-machine interface(s)) 118, 120. For example, the coordinated control device 104 may receive commands from the user devices 118, 120 and may execute the commands using two or more of the rig systems 110, 112, 114, e.g., such that the operation of the two or more rig systems 110, 112, 114 act in concert and/or off-design conditions in the rig systems 110, 112, 114 may be avoided.

Figure 2:
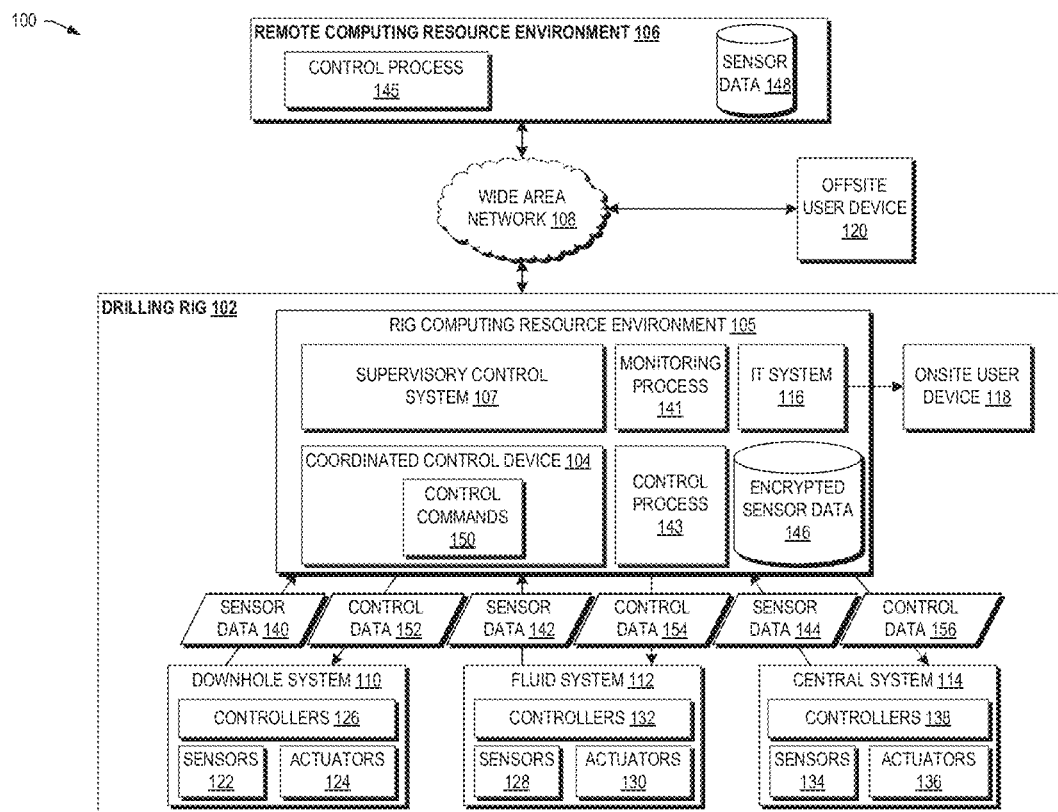
FIG. 2 illustrates a schematic view of a drilling rig and a remote computing resource environment, according to an embodiment.

FIG. 2 illustrates a conceptual, schematic view of the control system 100, according to an embodiment. The rig computing resource environment 105 may communicate with offsite devices and systems using a network 108 (e.g., a wide area network (WAN) such as the internet). Further, the rig computing resource environment 105 may communicate with the remote computing resource environment 106 via the network 108. FIG. 2 also depicts the aforementioned example systems of the drilling rig 102, such as the downhole system 110, the fluid system 112, the central system 114, and the IT system 116. In some embodiments, one or more onsite user devices 118 may also be included on the drilling rig 102. The onsite user devices 118 may interact with the IT system 116. The onsite user devices 118 may include any number of user devices, for example, stationary user devices intended to be stationed at the drilling rig 102 and/or portable user devices. In some embodiments, the onsite user devices 118 may include a desktop, a laptop, a smartphone, a personal data assistant (PDA), a tablet component, a wearable computer, or other suitable devices. In some embodiments, the onsite user devices 118 may communicate with the rig computing resource environment 105 of the drilling rig 102, the remote computing resource environment 106, or both.

One or more offsite user devices 120 may also be included in the system 100. The offsite user devices 120 may include a desktop, a laptop, a smartphone, a personal data assistant (PDA), a tablet component, a wearable computer, or other suitable devices. The offsite user devices 120 may be configured to receive and/or transmit information (e.g., monitoring functionality) from and/or to the drilling rig 102 via communication with the rig computing resource environment 105. In some embodiments, the offsite user devices 120 may provide control processes for controlling operation of the various systems of the drilling rig 102. In some embodiments, the offsite user devices 120 may communicate with the remote computing resource environment 106 via the network 108.

The user devices 118 and/or 120 may be examples of a human-machine interface. These devices 118, 120 may allow feedback from the various rig subsystems to be displayed and allow commands to be entered by the user. In various embodiments, such human-machine interfaces may be onsite or offsite, or both.

The systems of the drilling rig 102 may include various sensors, actuators, and controllers (e.g., programmable logic controllers (PLCs)), which may provide feedback for use in the rig computing resource environment 105. For example, the downhole system 110 may include sensors 122, actuators 124, and controllers 126. The fluid system 112 may include sensors 128, actuators 130, and controllers 132. Additionally, the central system 114 may include sensors 134, actuators 136, and controllers 138. The sensors 122, 128, and 134 may include any suitable sensors for operation of the drilling rig 102. In some embodiments, the sensors 122, 128, and 134 may include a camera, a pressure sensor, a temperature sensor, a flow rate sensor, a vibration sensor, a current sensor, a voltage sensor, a resistance sensor, a gesture detection sensor or device, a voice actuated or recognition device or sensor, or other suitable sensors.

The sensors described above may provide sensor data feedback to the rig computing resource environment 105 (e.g., to the coordinated control device 104). For example, downhole system sensors 122 may provide sensor data 140, the fluid system sensors 128 may provide sensor data 142, and the central system sensors 134 may provide sensor data 144. The sensor data 140, 142, and 144 may include, for example, equipment operation status (e.g., on or off, up or down, set or release, etc.), drilling parameters (e.g., depth, hook load, torque, etc.), auxiliary parameters (e.g., vibration data of a pump) and other suitable data. In some embodiments, the acquired sensor data may include or be associated with a timestamp (e.g., a date, time or both) indicating when the sensor data was acquired. Further, the sensor data may be aligned with a depth or other drilling parameter.

Acquiring the sensor data into the coordinated control device 104 may facilitate measurement of the same physical properties at different locations of the drilling rig 102. In some embodiments, measurement of the same physical properties may be used for measurement redundancy to enable continued operation of the well. In yet another embodiment, measurements of the same physical properties at different locations may be used for detecting equipment conditions among different physical locations. In yet another embodiment, measurements of the same physical properties using different sensors may provide information about the relative quality of each measurement, resulting in a "higher" quality measurement being used for rig control, and process applications. The variation in measurements at different locations over time may be used to determine equipment performance, system performance, scheduled maintenance due dates, and the like. Furthermore, aggregating sensor data from each subsystem into a centralized environment may enhance drilling process and efficiency. For example, slip status (e.g., in or out) may be acquired from the sensors and provided to the rig computing resource environment 105, which may be used to define a rig state for automated control. In another example, acquisition of fluid samples may be measured by a sensor and related with bit depth and time measured by other sensors. Acquisition of data from a camera sensor may facilitate detection of arrival and/or installation of materials or equipment in the drilling rig 102. The time of arrival and/or installation of materials or equipment may be used to evaluate degradation of a material, scheduled maintenance of equipment, and other evaluations.

The coordinated control device 104 may facilitate control of individual systems (e.g., the central system 114, the downhole system, or fluid system 112, etc.) at the level of each individual system. For example, in the fluid system 112, sensor data 128 may be fed into the controller 132, which may respond to control the actuators 130. However, for control operations that involve multiple systems, the control may be coordinated through the coordinated control device 104. Examples of such coordinated control operations include the control of downhole pressure during tripping. The downhole pressure may be affected by both the fluid system 112 (e.g., pump rate and choke position) and the central system 114 (e.g. tripping speed). When it is desired to maintain certain downhole pressure during tripping, the coordinated control device 104 may be used to direct the appropriate control commands. Furthermore, for mode based controllers which employ complex computation to reach a control setpoint, which are typically not implemented in the subsystem PLC controllers due to complexity and high computing power demands, the coordinated control device 104 may provide the adequate computing environment for implementing these controllers.

In some embodiments, control of the various systems of the drilling rig 102 may be provided via a multi-tier (e.g., three-tier) control system that includes a first tier of the controllers 126, 132, and 138, a second tier of the coordinated control device 104, and a third tier of the supervisory control system 107. The first tier of the controllers may be responsible for safety critical control operation, or fast loop feedback control. The second tier of the controllers may be responsible for coordinated controls of multiple equipment or subsystems, and/or responsible for complex model based controllers. The third tier of the controllers may be responsible for high level task planning, such as to command the rig system to maintain certain bottom hole pressure. In other embodiments, coordinated control may be provided by one or more controllers of one or more of the drilling rig systems 110, 112, and 114 without the use of a coordinated control device 104. In such embodiments, the rig computing resource environment 105 may provide control processes directly to these controllers for coordinated control. For example, in some embodiments, the controllers 126 and the controllers 132 may be used for coordinated control of multiple systems of the drilling rig 102.

The sensor data 140, 142, and 144 may be received by the coordinated control device 104 and used for control of the drilling rig 102 and the drilling rig systems 110, 112, and 114. In some embodiments, the sensor data 140, 142, and 144 may be encrypted to produce encrypted sensor data 146. For example, in some embodiments, the rig computing resource environment 105 may encrypt sensor data from different types of sensors and systems to produce a set of encrypted sensor data 146. Thus, the encrypted sensor data 146 may not be viewable by unauthorized user devices (either offsite or onsite user device) if such devices gain access to one or more networks of the drilling rig 102. The sensor data 140, 142, 144 may include a timestamp and an aligned drilling parameter (e.g., depth) as discussed above. The encrypted sensor data 146 may be sent to the remote computing resource environment 106 via the network 108 and stored as encrypted sensor data 148.

The rig computing resource environment 105 may provide the encrypted sensor data 148 available for viewing and processing offsite, such as via offsite user devices 120. Access to the encrypted sensor data 148 may be restricted via access control implemented in the rig computing resource environment 105. In some embodiments, the encrypted sensor data 148 may be provided in real-time to offsite user devices 120 such that offsite personnel may view real-time status of the drilling rig 102 and provide feedback based on the real-time sensor data. For example, different portions of the encrypted sensor data 146 may be sent to offsite user devices 120. In some embodiments, encrypted sensor data may be decrypted by the rig computing resource environment 105 before transmission or decrypted on an offsite user device after encrypted sensor data is received.

The offsite user device 120 may include a client (e.g., a thin client) configured to display data received from the rig computing resource environment 105 and/or the remote computing resource environment 106. For example, multiple types of thin clients (e.g., devices with display capability and minimal processing capability) may be used for certain functions or for viewing various sensor data.

The rig computing resource environment 105 may include various computing resources used for monitoring and controlling operations such as one or more computers having a processor and a memory. For example, the coordinated control device 104 may include a computer having a processor and memory for processing sensor data, storing sensor data, and issuing control commands responsive to sensor data. As noted above, the coordinated control device 104 may control various operations of the various systems of the drilling rig 102 via analysis of sensor data from one or more drilling rig systems (e.g. 110, 112, 114) to enable coordinated control between each system of the drilling rig 102. The coordinated control device 104 may execute control commands 150 for control of the various systems of the drilling rig 102 (e.g., drilling rig systems 110, 112, 114). The coordinated control device 104 may send control data determined by the execution of the control commands 150 to one or more systems of the drilling rig 102. For example, control data 152 may be sent to the downhole system 110, control data 154 may be sent to the fluid system 112, and control data 154 may be sent to the central system 114. The control data may include, for example, operator commands (e.g., turn on or off a pump, switch on or off a valve, update a physical property setpoint, etc.). In some embodiments, the coordinated control device 104 may include a fast control loop that directly obtains sensor data 140, 142, and 144 and executes, for example, a control algorithm. In some embodiments, the coordinated control device 104 may include a slow control loop that obtains data via the rig computing resource environment 105 to generate control commands.

In some embodiments, the coordinated control device 104 may intermediate between the supervisory control system 107 and the controllers 126, 132, and 138 of the systems 110, 112, and 114. For example, in such embodiments, a supervisory control system 107 may be used to control systems of the drilling rig 102. The supervisory control system 107 may include, for example, devices for entering control commands to perform operations of systems of the drilling rig 102. In some embodiments, the coordinated control device 104 may receive commands from the supervisory control system 107, process the commands according to a rule (e.g., an algorithm based upon the laws of physics for drilling operations), and/or control processes received from the rig computing resource environment 105, and provides control data to one or more systems of the drilling rig 102. In some embodiments, the supervisory control system 107 may be provided by and/or controlled by a third party. In such embodiments, the coordinated control device 104 may coordinate control between discrete supervisory control systems and the systems 110, 112, and 114 while using control commands that may be optimized from the sensor data received from the systems 110 112, and 114 and analyzed via the rig computing resource environment 105.

The rig computing resource environment 105 may include a monitoring process 141 that may use sensor data to determine information about the drilling rig 102. For example, in some embodiments the monitoring process 141 may determine a drilling state, equipment health, system health, a maintenance schedule, or any combination thereof. Furthermore, the monitoring process 141 may monitor sensor data and determine the quality of one or a plurality of sensor data. In some embodiments, the rig computing resource environment 105 may include control processes 143 that may use the sensor data 146 to optimize drilling operations, such as, for example, the control of drilling equipment to improve drilling efficiency, equipment reliability, and the like. For example, in some embodiments the acquired sensor data may be used to derive a noise cancellation scheme to improve electromagnetic and mud pulse telemetry signal processing. The control processes 143 may be implemented via, for example, a control algorithm, a computer program, firmware, or other suitable hardware and/or software. In some embodiments, the remote computing resource environment 106 may include a control process 145 that may be provided to the rig computing resource environment 105.

The rig computing resource environment 105 may include various computing resources, such as, for example, a single computer or multiple computers. In some embodiments, the rig computing resource environment 105 may include a virtual computer system and a virtual database or other virtual structure for collected data. The virtual computer system and virtual database may include one or more resource interfaces (e.g., web interfaces) that enable the submission of application programming interface (API) calls to the various resources through a request. In addition, each of the resources may include one or more resource interfaces that enable the resources to access each other (e.g., to enable a virtual computer system of the computing resource environment to store data in or retrieve data from the database or other structure for collected data).

The virtual computer system may include a collection of computing resources configured to instantiate virtual machine instances. The virtual computing system and/or computers may provide a human-machine interface through which a user may interface with the virtual computer system via the offsite user device or, in some embodiments, the onsite user device. In some embodiments, other computer systems or computer system services may be utilized in the rig computing resource environment 105, such as a computer system or computer system service that provisions computing resources on dedicated or shared computers/servers and/or other physical devices. In some embodiments, the rig computing resource environment 105 may include a single server (in a discrete hardware component or as a virtual server) or multiple servers (e.g., web servers, application servers, or other servers). The servers may be, for example, computers arranged in any physical and/or virtual configuration In some embodiments, the rig computing resource environment 105 may include a database that may be a collection of computing resources that run one or more data collections. Such data collections may be operated and managed by utilizing API calls. The data collections, such as sensor data, may be made available to other resources in the rig computing resource environment or to user devices (e.g., onsite user device 118 and/or offsite user device 120) accessing the rig computing resource environment 105. In some embodiments, the remote computing resource environment 106 may include similar computing resources to those described above, such as a single computer or multiple computers (in discrete hardware components or virtual computer systems).

Figure 3A:
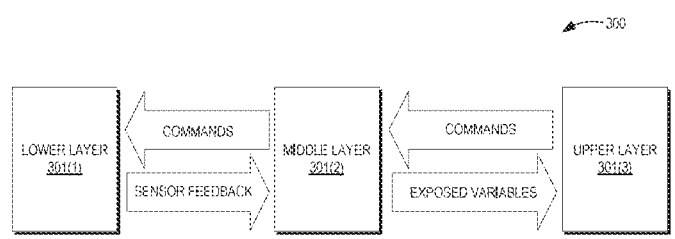
FIGS. 3A, 3B, and 4 illustrate conceptual, schematic views of a rig control system, according to an embodiment.

FIG. 3A illustrates a simplified, conceptual view of a rig control system 300 for performing operations on a rig, according to an embodiment. The system 300 may generally include conceptual "layers" in which different types of control operations may be conducted, e.g., of successively greater complexity, as will be described below. This may allow the system 300 to be modular and to operate on an encapsulated-data basis, which may facilitate update, maintenance, coordinated control, extensibility, etc., examples of which will be described in greater detail below. Each layer may include one or more (and/or a part or parts of) controllers, which may execute software configured to implement the tasks assigned to the respective layers.

In the illustrated example, the system 300 includes a lower layer 301(1), a middle layer 301(2), and an upper layer 301(3). The terms "lower", "middle", and "upper" are used herein to describe conceptual differentiation. In an example embodiment, the lower layer could be a conceptual first layer, the middle layer could be a conceptual second layer, and the upper layer could be a conceptual third layer. Conceptually, the lower layer 301(1) may execute low-complexity, fast-loop control of the physical subsystems of the rig 102. A rig subsystem may be any device or group of devices that are configured to perform a task on the rig, such as one or more, or a part of, the central subsystem, downhole subsystem, fluids subsystem, etc. An example of such control may be to set a machine parameter such as rotating speed (e.g., executing a "parameter-based" command). The lower layer 301(1) may also receive measurements from sensors positioned in the various physical subsystems.

The middle layer 301(2) may receive feedback (e.g., sensor feedback, as shown) from the lower layer 301(1), may make decisions based on this feedback, may execute controller coordination of multiple equipment or subsystems in the lower layer 301(1), and may execute complex model based controllers that are computationally intensive and may not be available in a PLC type controller of the lower layer 301(1). An example of such coordinated control may include maintaining a constant bottom hole pressure, which may call for two or more controllers at the lower layer 301(1) to coordinate the operation of drawworks, the mud pump, and the managed pressure drilling (MPD) choke on the return line. An example of a complicated model based controller may include running a torque and drag simulator in order to control the surface torque for directional control. The sensor data upon which the determination is made in the middle layer 301(2) may come from several different subsystems, as the middle layer 301(2) may have the ability to access sensor information from the various subsystems controlled directly by the lower layer 301(1), and thus may be said to aggregate the sensor data for analysis.

The middle layer 301(2) may also provide a clock, which may facilitate the application of a timestamp that is consistent among sensor data acquired in the various different rig subsystems. In an example, the middle layer 301(2) may provide the clock data to the lower layer 301(1), and the controllers of the lower layer 301(1) may apply a timestamp based on the clock data. In another example, the middle layer 301(2) may apply the timestamp directly to sensor data received from the lower layer 301(1).

The middle layer 301(2) may also convert high-level, task-based commands (such as to drill a stand) from the upper layer 301(3) into discrete and/or independent commands, which may be executed by individual controllers in the middle layer 301(2) or in the lower layer 301(1). Further, the middle layer 301(2) may provide exposed variables to the upper layer 301(3), which may allow the upper layer 301(3) to adjust system 300 parameters without risking safety of the rig. The upper layer 301(3) may provide adjustments to these exposed variables, which, again, the middle layer 301(2) may convert to one or more discrete commands for implementation in the lower layer 301(1).

The upper layer 301(3) may perform higher-level, generally non-deterministic operations, which may be relatively high-latency as compared to the operations of the lower and middle layers 301(1), 301(2). Continuing with the example above, the upper layer 301(3) may execute well production, simulation, and/or planning software, from which it may be determined that a particular pressure of fluid may be suited for use. The upper layer 301(3) may thus provide a task-based command to make the pressure of this fluid reach the determined value, which the middle layer 301(2) may convert to one or more discrete commands (e.g., as part of a feedback loop) for implementation by the lower layer 301(1). In some embodiments, the upper layer 301(3) may provide the clock, e.g., in addition to or instead of the middle layer 301(2) providing the clock.

In operation, the lower layer 301(1) may conduct relatively low complexity operations. These may be executed using the fast-loop feedback, and may be employed to ensure safety, modulate operating parameters, etc. The middle layer 301(2) may conduct higher complexity operations, such as integration, as well as coordination of several subsystems, in order to achieve a task-based command. The upper layer 301(3) may conduct operations of higher complexity still, such as well planning, production, simulation, etc., operations, which may generate the task-based instructions.

Accordingly, the provision of the middle layer 301(2) may allow for the aforementioned subsystem encapsulation, which may facilitate safety measures within a subsystem, such as avoiding mechanical collision in the rig equipment. The middle layer 301(2) further provides an environment to execute coordinated control of multiple pieces of equipment or subsystems in a relatively fast loop (e.g. 1 millisecond to 1 second). Furthermore, the middle layer 301(2) may promote a loose coupling of different rig subsystems in the rig control system, allowing different subsystem to be easily integrated into or removed from the overall rig control system.

For example, the middle and upper layers 301(2), 301(3) may be unchanged when subsystems and/or subsystem controllers are added, removed, or otherwise changed. Accordingly, the middle and upper layers 301(2) and 301(3) might not have to be requalified for safety. Further, the individual subsystem controllers in the lower layer 301(1) may responsible for safety within the individual subsystem, such as to avoid mechanical collisions. Through the encapsulation of the subsystems, and the loosely coupling of each subsystem, changes in one subsystem may not require changes or re-qualification of other subsystems. Thus, while a new or changed individual subsystem may result in a (re)qualification of that subsystem, because the safety controls are encapsulated within the individual subsystem controllers, the other subsystem controllers might not be requalified. Accordingly, the time and effort to adjust subsystem components may be reduced.

In addition, once different subsystems are electrically connected via the lower layer 301(1), software changes in the middle layer 301(2), e.g., instead of hardware changes, may be employed to effect control of the new, replaced, or remaining subsystem(s) (e.g., after a removal), including coordinated control among two or more systems.

Furthermore, the lower layer 301(1) may include redundant systems, e.g., producing redundant information about operating parameters of the drilling rig. The middle layer 301(2) may recognize such redundancies and, further, may use trends in and/or comparisons between such redundant information to determine accurate information, such as by selecting data from a sensor that appears to be more accurate or reliable.

Figure 3B:
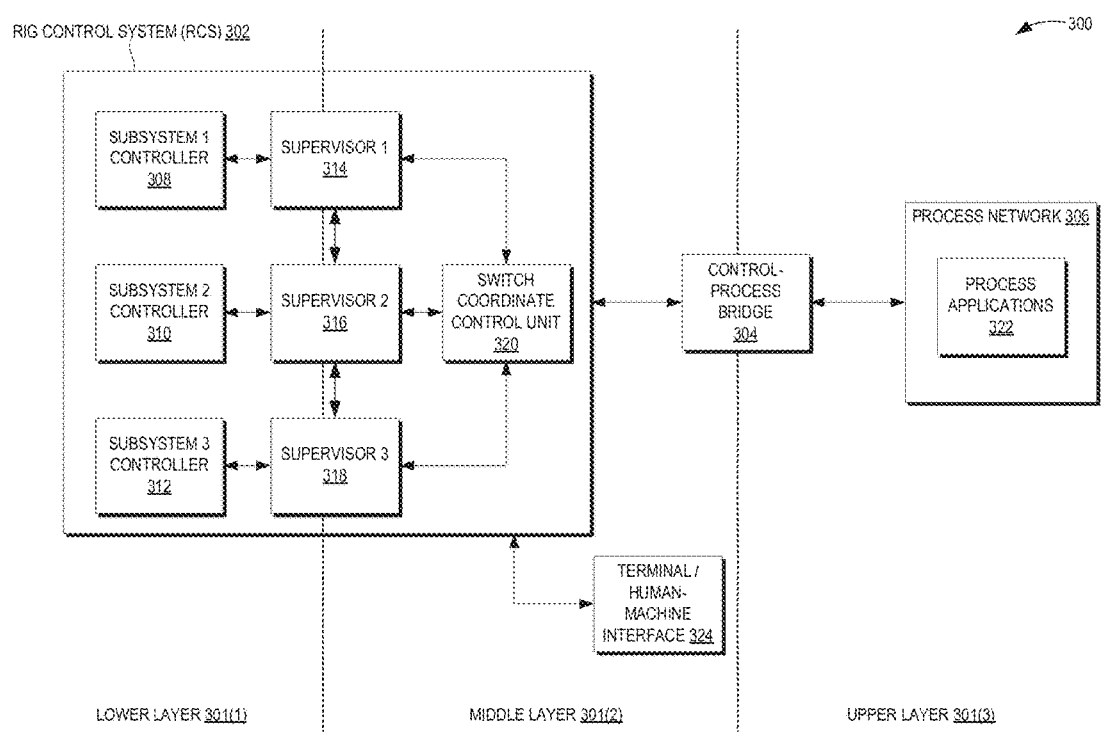

FIG. 3B illustrates a more detailed, conceptual, schematic view of the system 300, according to an embodiment. As shown, the system 300 may include a rig control system 302, which may include various controllers (e.g., one or more programmable logic controllers), and which may implement one or more of the aforementioned layers 301(1)-(3). For example, the rig control system 302 may include one or more subsystem controllers (three shown: 308, 310, 312), which may be configured to control operation of physical subsystems such as pumping systems, managed pressure drilling systems, drawworks, a top drive system, downhole systems, portions thereof, combinations thereof, etc.

Accordingly, the subsystem controllers 308, 310, 312 may be capable of modifying the operating parameters of the associated subsystems, with such modifications being automatically carried out by the associated physical subsystem. In some embodiments, control of the various subsystems may be partitioned, such that one subsystem controller 308, 310, 312 may not directly control another subsystem. In another embodiment, one subsystem controller 308, 310, 312 may directly control equipment from another subsystem. Further, the subsystem controllers 308, 310, 312 may communicate with one or more supervisor controllers (three are shown: 314, 316, 318), e.g., respectively.

Individual subsystem controllers 308, 310, 312 may operate quasi-independently. For example, the individual subsystem controllers 308, 310, 312 may be capable of implementing feedback loops as well as monitoring safety conditions in the rig subsystems, e.g., without referring to other system controllers 308, 310, 312. This encapsulation of the lower level control may allow for a loosely-coupled system, in which the operation of the subsystems (e.g., coordination thereof) may be conducted at least partially by software, so as to facilitate modification to the lower layer 301(1), e.g., by adding, changing, or removing subsystems.

The supervisor controllers 314, 316, 318 serve as the interface between the middle layer 301(2) and the lower layer 301(1), providing for interaction therebetween. For example, the supervisor controllers 314, 316, 318 may communicate with the lower layer 301(1) via a deterministic field bus protocol (such as ProfiNET, ProfiBUS, etc). They may further communicate with the middle layer 301(2) via a data centric publisher-subscriber protocol (such as DDS). They facilitate the loosely coupled nature of the subsystems. The supervisor controllers 314, 316, 318 may be configured to receive data from various different kinds of subsystem controllers. Different kinds of subsystem controllers may have different configurations, read different types of data from different kinds of sensors, implement different types of commands (e.g., based on different hardware in the subsystems), etc. Accordingly, the supervisor controllers 314, 316, 318 may include subsystem parts that may be configurable to account for such differences.

The subsystem controllers 308, 310, 312 and the subsystem-part-side of the supervisor controllers 314, 316, 318 may thus provide at least part of the lower layer 301(1). Each subsystem controller 308, 310, 312 may expose information to the rig control system 302 through the supervisor controllers 314, 316, 318, respectively, and may execute deterministic commands related to the operating parameters of the physical subsystems therefrom. Sensor data obtained by each subsystem may have a self- or automated-calibration feature, and may include a quality metric to indicate its state of health (e.g. "good" or "bad"). For example, the subsystem controllers 308, 310, 312 may expose interfaces used to operate such a system. As such, the logic of each subsystem may be encapsulated, and a safety policy may be implemented within each subsystem. Through this encapsulation, individual subsystem may be updated in a "plug and play" manner, e.g., without requiring any modification or requalification of other subsystems.

The supervisor controllers 314, 316, 318 may also include an operating system part, and thus may form the boundary between the lower layer 301(1) and the middle layer 301(2). The operating system parts may communicate with a switch, coordinate, and control unit 320 (hereafter, "control unit 320). The middle layer 301(2) may include a supervisor part of the control unit 320.

The control unit 320 may communicate with the supervisor controllers 314, 316, 318 and may relay communications therebetween to effect coordinated control of the various subsystems. Further, the control unit 320 may include an operating system, which may be operable to ensure that modifications to one subsystem are accounted for in the operation of another subsystem, as will be described in greater detail below. The control unit 320 may also serve as a second-level feedback controller, taking information from the supervisor controllers 314, 416, 318 and determining what, if any, adjustments are to be made to effect higher-level control operations, and providing such adjustments deterministically to the supervisor controllers 314, 316, 318.

Moreover, the control unit 320 may implement safety interlocks among various subsystems, which may serve to ensure operation of one subsystem does not violate the safety of the others (e.g., by calling for off-design parameters of the physical subsystems). In addition, the control unit 320 may contain controllers that may coordinate the operation of different subsystems to achieve a control objective, such as coordinating the operation of pumps (e.g., in the fluid system), top drive (e.g., in the rig central system), and the well flow choke (e.g., in the managed pressure drilling system). The control unit 320 may further implement a control arbiter that arbitrates control commands coming from various components, such as the human machine interface 324 of the control system, the supervisory control interface in the process network 306, or from the controllers within the control unit 320. When a conflict rises, the arbiter may decide which control command may be executed, and which may be ignored. Results of the arbitration may be provided to different components (e.g., the human-machine interface 324, supervisory control (e.g., the high-speed controller 402), etc.) in the system. The rig control system 302 may operate in real time to support such coordinated control of different subsystems.

Further, the control unit 320 may form the boundary between the middle layer 301(2) and the upper layer 301(3). For example, the control unit 320 may include a supervisor part (in the middle layer 301(2)) that may interface with the supervisor controllers 314, 316, 318 and a process part (in the upper layer 301(3)) that may interface with a process network 306, e.g., via a control-process bridge 304. The control-process bridge 304 may confirm an identity and authorization of modifications received from outside of the rig control system 302.

The control unit 320, e.g., the supervisor part in the middle layer 301(2), may execute software that may determine what system variables may be exposed to the process network 306. Further, the control unit 320 may receive task planning commands from the process network 306, and may convert these commands into discrete commands, e.g., using rules, logic, etc., to effect a design goal specified by one or more applications executing on the process network 306. Communication protocol used in this middle layer among different actors (supervisor 1, supervisor 2, and control unit 320, etc.) may use a data-centric communication middleware with suitable quality of service metric to ensure that commands are delivered reliably with real time characteristics.

The control-process bridge 304 may liaise between the process network 306 and the control unit 320. In an embodiment, the control-process bridge 304 may serve as a historian for interactions between the rig control system 302 and the process network 306. Accordingly, the control-process bridge 304 may provide forensic data, in case of a failure (analogous to a black-box recorder on an aircraft), which may later be accessed and employed to troubleshoot, or the like.

The process network 306 may provide an environment where more complicated or high-level supervisory control applications, and data analysis and monitoring applications may be executed. Such applications may be examples of process applications 322. The process applications 322 may execute tasks such as well planning, simulations, drilling parameter optimization, etc. Such applications may be partitioned from the rig control system 302, as noted above, to avoid lock loops or other situations that may affect the timely operation of the rig control system 302.

The system 300 may also include a terminal or human-machine interface 324. The terminal 324 may allow for a user to view data acquired by the sensors of the various subsystems controlled by the rig control system 302. The terminal 324 may also allow for modifying certain operating parameters of the subsystems by interaction with the rig control system 302. The HMI 324 may form part of the middle layer 301(1) in certain embodiments, such that commands received therefrom may be checked for safety and/or coordinated among one or more subsystems, e.g., using the control unit 320 and/or one or more of the supervisor controllers 314, 316, 318.

Accordingly, the different subsystems, rig control system 302, bridge 304, and/or process network 306 may include a variety of different controllers, which may be implemented as PLCs. In some instances, different PLCs may operate using different interfaces. In some implementations, this may cause disparate displays in the overall rig control system, as a unified display of the same "look and feel" may not be maintained. In the present system 300, since the control data from each subsystem is exposed to the rig control system 302 through the supervisors 314, 316, 318, a uniform look and feel of the interfaces linked to the different controllers of the system 300 can be maintained. As such the system 300 may provide an abstracted interface, which may implement shared memory and/or a uniform clock across controllers and subsystems. Furthermore, the system 300 may provide a single clock for each subsystem and, e.g., any other computer systems on the rig, which will be described in greater detail below.

Furthermore, this uniformized interface may facilitate curated provision of information to the different interfaces. The amount of information available in such a shared-memory system may be vast, and more than is called for to perform any single operation or even rig subsystem operation. Accordingly, the interface may enforce a role-based information provision, providing information to users based on the tasks that they are assigned to perform, and omitting other information unrelated to their tasks. The interface may further enforce an event-based information provision, providing information to users based on the events in the operation.

Figure 4:
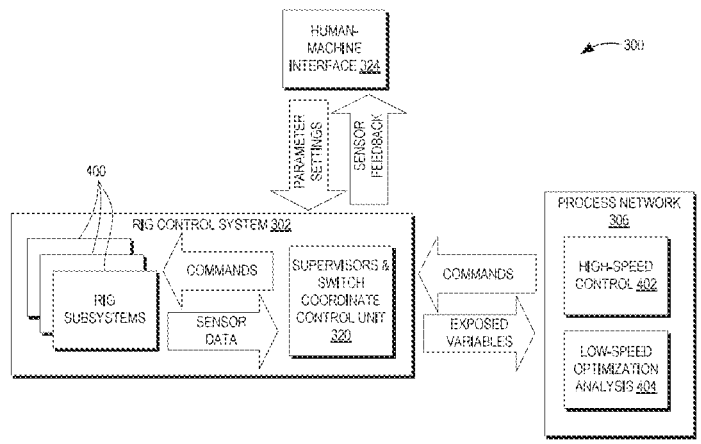

FIG. 4 illustrates a schematic view of the system 300 of FIG. 3, further illustrating the flow of information between the components thereof, according to an embodiment. As shown, and also noted above with respect to FIG. 3B, the rig control system 302 communicates with the process network 306 (e.g., via the control-process bridge 304, which is not shown in FIG. 4). The rig control system 302 also communicates with one or more rig subsystems 400, e.g., via the subsystem controllers 308, 310, 312 (FIG. 3). In particular, the rig control system 302 may provide deterministic and/or low latency commands to the rig subsystems 400, and receive sensor data therefrom. The sensor data may be given a timestamp at the rig control system 302. The sensor data may be stored locally at the rig subsystems 400 and/or may be stored in the rig control system 302, or elsewhere, such as in a database that is accessible to the rig control system 302. The sensor data may also be stored in the process network 306.

The rig control system 302 may expose certain editable parameters to the control process bridge 304. This is illustrated as "exposed variables" in FIG. 4. Further, the rig control system 302 may receive deterministic or non-deterministic commands from the control-process bridge 304. In turn, the control-process bridge 304 may provide the exposed variables to the process network 306, and may receive commands therefrom. The commands received from the process network 306 may or may not be deterministic.

The process network 306, e.g., executing the process applications 322, may have functionality for high-speed control 402 and/or low-speed optimization analysis 404. For example, such high-speed control 402 may rapidly receive the exposed variables, make decisions based thereon, and provide responsive commands, e.g., in or near real-time. By contrast, the low-speed optimization analysis 404 may make decisions that are more long term, e.g., based on simulations, interpretation of conditions, trends, etc., and may adjust the rig operations accordingly.

In an embodiment, the rig control system 302 may have built-in network redundancy. For example, each subsystem may expose control data, acquisition data related to the operation, and equipment health monitoring data related to the condition of the equipment. These data may enter into the control system 302 through the supervisors 314, 316, 318. In some embodiments, one physical network may carry the control and acquisition data, and a separate physical network may carry equipment health monitoring data. In case of failure in the network that carries the control and acquisition data, the other network might be automatically switched to carry control and acquisition data, allowing the continued operation of the rig control system.

Figure 5:
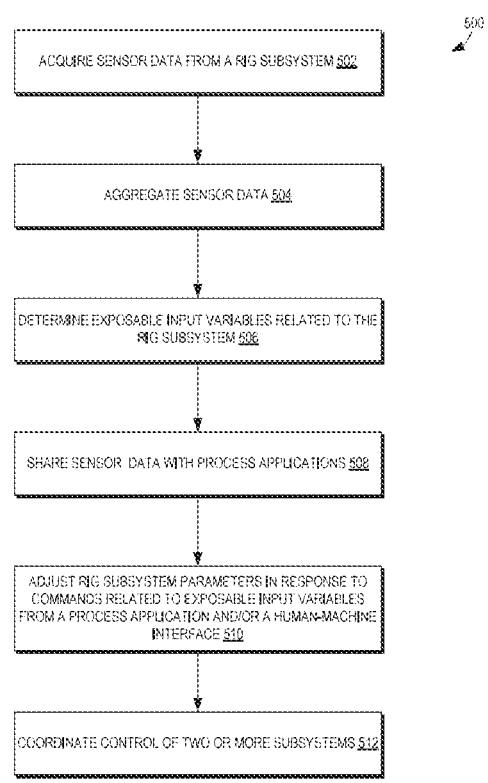
FIG. 5 illustrates a flowchart of a method for controlling rig subsystems, according to an embodiment.

FIG. 5 illustrates a method 500 for controlling rig subsystems, according to an embodiment. The method 500 may include acquiring sensor data from a rig subsystem, as at 502. The sensor data may be any type of sensor data, related to any type of sensor of any subsystem. Accordingly, such sensor data may include position, temperature, velocity, pressure, acceleration, vibration, etc., received from sensors positioned within pumping systems, drawworks, top drives, downhole tools, managed pressure drilling systems, or any other subsystem associated with the rig. Each sensor data may contain a quality metric (e.g., "good" or "bad"), with the metric being assigned based on a variety of different factors. Furthermore, such sensor data may be associated with a timestamp. Since control of the rig may be operated by a single system 300 (see, e.g., FIG. 3B), the timestamp may be enforced uniformly on the sensor measurements, which may allow for correlation of sensor data across multiple sensors in multiple subsystems.

The method 500 may include aggregating the sensor data, as at 504. Such aggregation may include combining sensor data to provide calculated parameters, e.g., using the timestamp. Another example of aggregating may, more simply, include providing the data to a database, e.g., in association with the timestamp, e.g., saving the sensor data to memory.

The method 500 may also include determining exposable input variables related to the rig subsystem, as at 506. The exposable input variables may relate to one or more physical operating parameters of the rig subsystems, but may be abstracted therefrom by at least one layer. Accordingly, the rig control system 302, having received adjustments to the exposable input variables, may determine, e.g., through operation of the unit 320, whether to implement changes implied by modifications to the exposable input variables, based on, for example, operational safety of the rig subsystems. This may prevent the rig subsystems from operating off-design.

Having determined what to expose, the method 500 may include sharing the sensor data with process applications, as at 508. This may occur, as shown in FIGS. 3 and 4, via the control-process bridge 304.

The method 500 may also include adjusting one or more rig subsystem parameters in response to commands related to the exposable input variables from a process application and/or from the human-machine interface, as at 510. Further, the rig control system 302, e.g., the unit 320, implementing the method 500 may coordinate control of two or more subsystems 512, such that adjustments implemented based on the commands received in 510 do not negatively affect operational safety.

Figure 6:
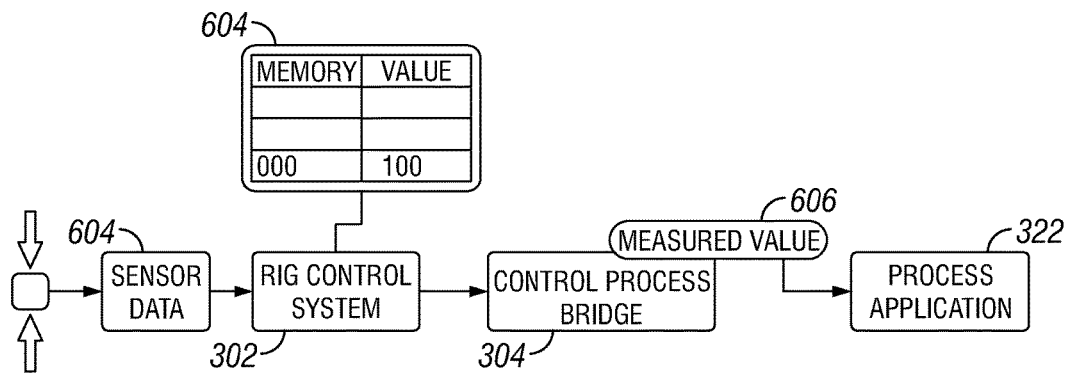
FIG. 6 illustrates a schematic view of a system for exposing sensor data to a process application, according to an embodiment.

FIG. 6 illustrates a schematic view of a workflow 600 in which sensor data may be exposed to a process application, according to an embodiment. It will be appreciated this is merely an illustrative example, and not to be considered limiting. Rather, the workflow may be generalized to apply to any type of data, subsystem, control, etc.

The workflow 600 may begin by receiving sensor data 602 from one or more sensors positioned in a rig subsystem. The sensor data 602 may, in a specific example, then be transmitted to the rig control system 302, where it may be stored in a memory 604. Upon request, and if the data is exposable, the rig control system 302 may expose a measured value 606 via the control-process bridge 304. This measured value 606 may then be received by the process application 322 executing on the process network 306 (FIG. 3).

Figure 7:
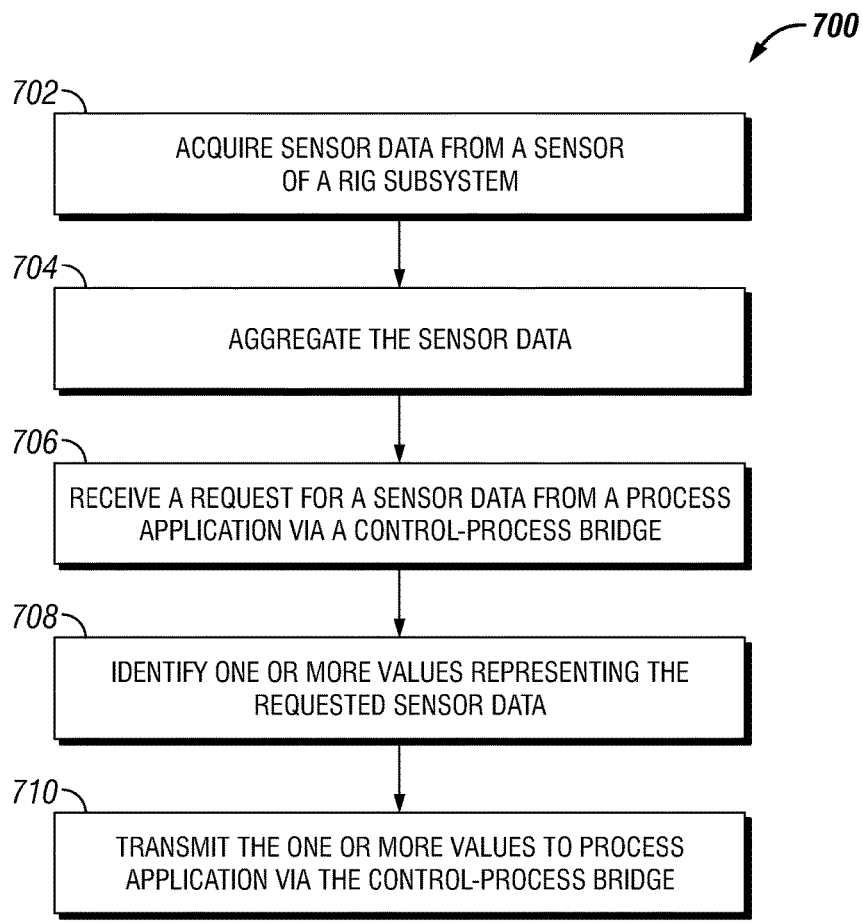
FIG. 7 illustrates a flowchart of a method for exposing sensor data to a process application, according to an embodiment.

FIG. 7 illustrates a flowchart of a method 700 for transmitting sensor data from the rig control system 302 to the process network 306, according to an embodiment. The method 700 may include acquiring the sensor data from a sensor of a rig subsystem. As mentioned above, this may be any type of sensor from any rig subsystem. The method 700 may also include aggregating (storing, calculating secondary variable, etc.) the sensor data, as at 704. The method 700 may further include receiving a request for sensor data from the process application 322 via the control-process bridge 304, as at 706. The rig control system 302 may then identify one or more values representing the requested sensor data, as at 708. If the values are exposable, the rig control system 302 may, in response to the request, transmit the one or more values of the process application via the control-process bridge 304, as at 710.

Figure 8:
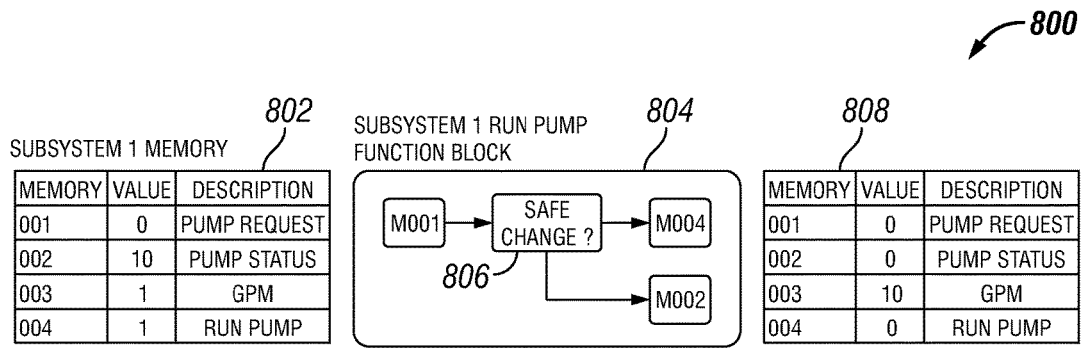
FIG. 8 illustrate a schematic view of a system for modifying one or more operating parameters of a subsystem, according to an embodiment.

FIG. 8 illustrates a workflow 800 for receiving commands at the rig control system 302 from the process application 322 and/or the human-machine interface 324, according to an embodiment. The example in FIG. 8 employs a simplistic pump operation as one example; however, it will be appreciated that this is merely illustrative and not to be considered limiting. Rather, this example may be generalized for use with any machine, subsystem, set of operating parameters, memory locations, etc.

The workflow 800 may include accessing a subsystem memory 802 in a first state. The subsystem memory 802 may have several locations 001-004, as shown in this simplistic example. Each memory location may store a value, which may correspond to a named parameter, as shown.

The exposable variable may be stored at 002 in this simplistic example, which here indicates the pump status. The rig control system 302 may thus receive a change command via an exposable pump-request variable that is stored at 001. The pump-request variable, in this example, corresponds to a request to run the pump.

The rig control system 302 may then determine whether the change requested via the exposable variable represents a "safe" change, e.g., if the rig subsystem(s) will operate within a safe design envelope if the requested change is implemented, as at 806. If the change request is to be implemented, the rig control system 302 may change the physical parameter, in this example, the "run pump" variable stored at 004. The result of the update may be stored or otherwise communicated to the subsystem memory, resulting in a state 806 thereof, as shown. It will be appreciated that this workflow 800 may be applied to any type of subsystem, with any suitable type of variables.

Figure 9:
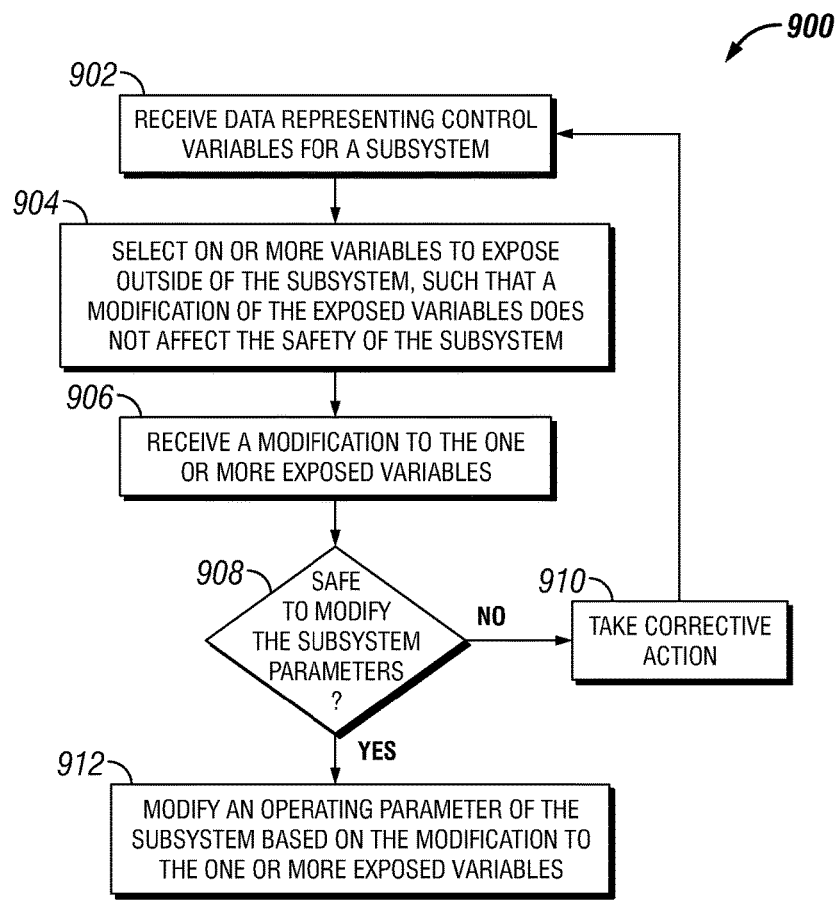
FIG. 9 illustrates a flowchart of a method for modifying one or more operating parameters of the subsystem, according to an embodiment.

FIG. 9 illustrates a flowchart of a method 900 for safely modifying a physical system parameter of a subsystem, according to an embodiment. The method 900 may include receiving data representing one or more control variables (operating parameters) for a subsystem, as at 902. The method 900 may also include selecting one or more variables to expose outside of the subsystem, such that a modification of the exposed variables does not affect the safety of the subsystem, as at 904. Such exposed variables may be similar to the pump request variable example discussed above with reference to FIG. 8.

The method 900 may also include receiving a modification to the one or more exposed variables, as at 906. As noted above, a modification to the exposed variable may not correspond to a change in a system parameter, but may invoke logic on the rig control system 302, for example, which may determine whether to modify one or more operating parameters based on the change to the exposed variable. The logic may, for example, determine whether it is safe to modify the subsystem parameters, as at 908, in response to the modified, exposed variable. If it is not safe (i.e., determination at 908 is 'NO'), the method 900 may include taking corrective action, as at 910. Such corrective action may include not implementing the change to the physical parameter and/or indicating that the requested change, if implemented, would result in unsafe or out of design operating conditions in one or more subsystems.

If the determination at 908 is that the modification is safe or otherwise may be implemented (i.e., a 'YES' determination at 908), the method 900 may proceed to modifying an operating parameter of the subsystem based on the modification to the one or more exposed variables, as at 912.

Figure 10:
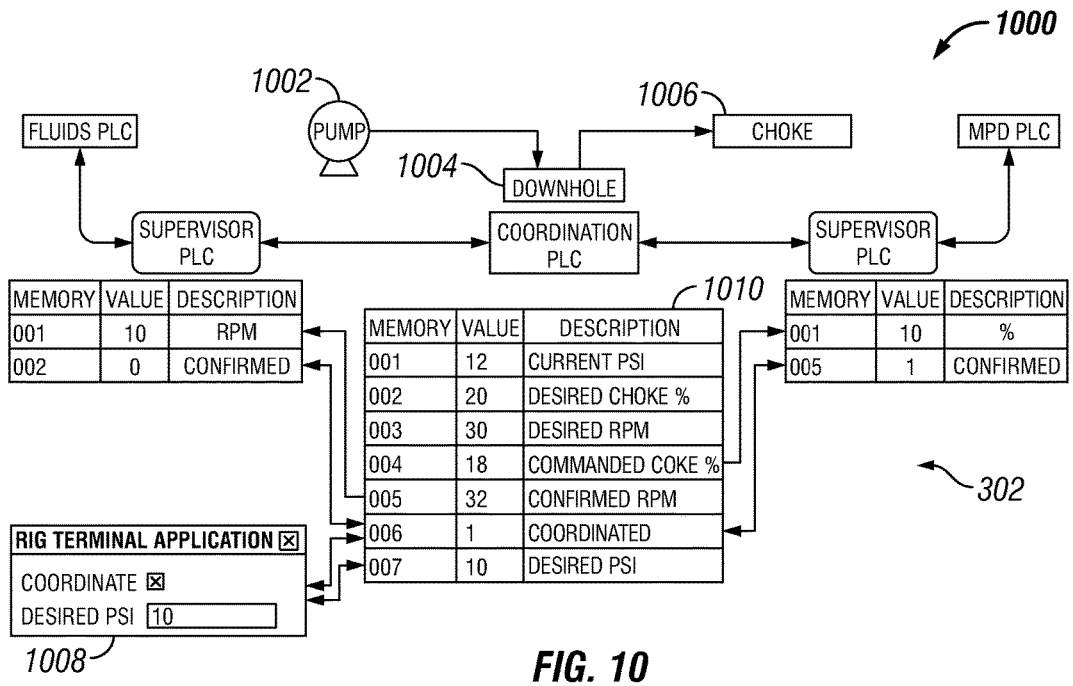
FIG. 10 illustrates a schematic view of a rig control system with coordinated control, according to an embodiment.

FIG. 10 illustrates a schematic view of a rig system 1000, with a coordinated control of the rig subsystems in the rig control system 300, according to an embodiment. The rig system 1000 may include a plurality of rig subsystems 1002, 1004, 1006. The rig subsystems 1002, 1004, 1006 may be, in this example, a pump, a downhole system, and a choke (e.g., as part of a managed pressure drilling subsystem). Other subsystems may additionally or instead be employed.

Figure 11:
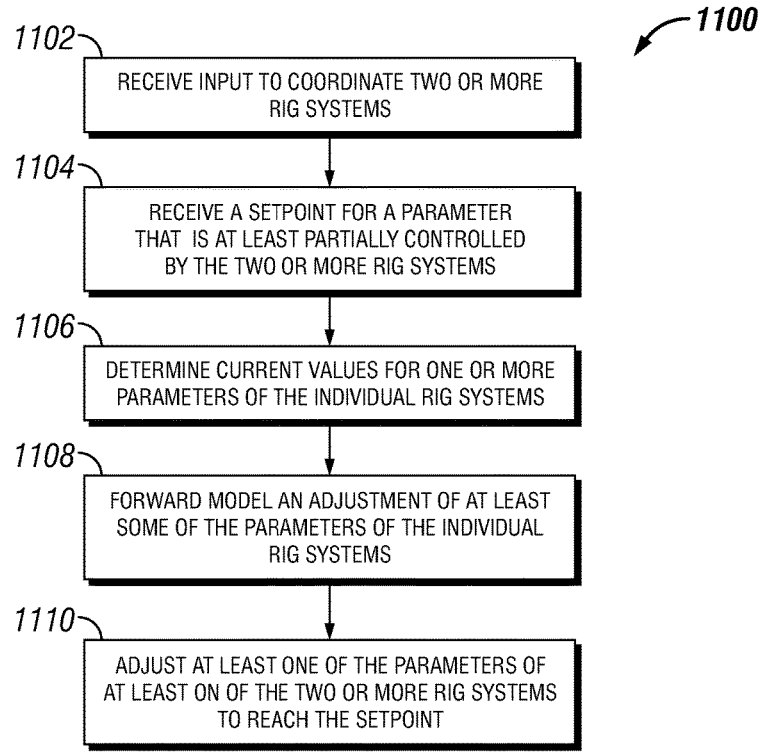
FIG. 11 illustrates a flowchart of a method for coordinating control of a rig system, according to an embodiment.

Operation of the rig system 1000 may be implemented at least partially using, for example, a method 1100 as illustrated in the flowchart of FIG. 11, according to an embodiment. The method 1100 may include receiving, as input, an indication that two or more of the rig subsystems 1002, 1004, 1006 may be coordinated in operation, as at 1102. The method 1100 may also include receiving a setpoint for a parameter that is at least partially controlled by the two or more rig subsystems, as at 1104.

For example, as illustrated in FIG. 10, a rig terminal application 1008 may be executing on the human-machine interface 324. The rig terminal application 1008 may include a selector indicating whether to coordinate operation, as well as an exposed variable for user adjustment. For example, the exposed variable might be pressure. The inputs from the rig terminal application 1008 may be stored in a database 1010 in association with the parameters to which they relate.

In order to determine how to adjust two or more of the subsystems (e.g., the choke 1006 and the pump 1002) to effect the desired change in the input variable, the method 1100 may include determining the current values for one or more parameters of the individual rig systems, as at 1106. The method 1100 may then forward model one or more changes that may tend to affect the parameter that is sought to be changed, in order to determine changes in the two or more rig system that allow the system 300 to arrive at, or near to, the desired parameter change. Once such changes are modeled, the method 1100 may proceed to adjusting at least one of the parameters of at least one of the two or more rig subsystems to reach the setpoint, as at 1110.

Figure 12:
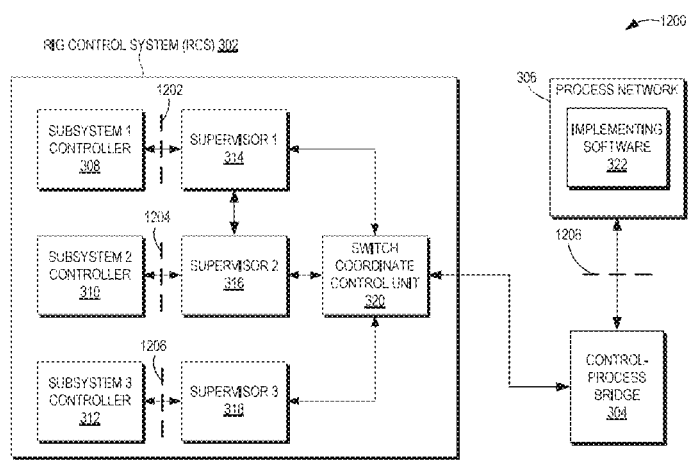
FIG. 12 illustrates a schematic view of a rig control system with a firewall between the subsystems and the rig control system, according to an embodiment.

FIG. 12 illustrates a schematic view of a system 1200 that includes access controls between the rig subsystem controllers 308, 310, 312, according to an embodiment. The system 1200, in an embodiment, may include firewalls 1202, 1204, 1206, 1208.

Figure 13:
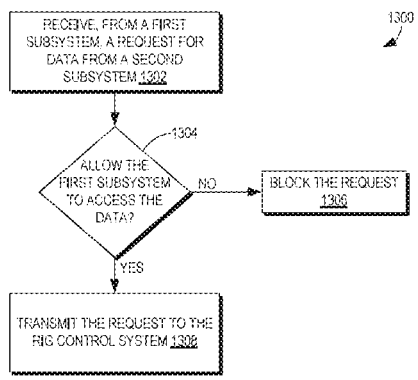
FIG. 13 illustrates a flowchart of a method for selectively allowing communication from the subsystems to the rig control system, according to an embodiment.

The system 1200 may be operated according to an embodiment of a method 1300, as illustrated in the flowchart of FIG. 13, according to an embodiment. The method 1300 may include receiving, from a first subsystem, a request for data from a second subsystem, as at 1302. The request received at 1302 may be received at one of the firewalls 1202, 1204, 1206. The firewalls 1202, 1204, 1206 may each be provided by standalone hardware or by software implemented in any of the components of the system 1200.

The firewalls 1202, 1204, 1206 may then determine whether the requesting ("first") subsystem is allowed to access the requested data, as at 1304. For example, contractors may be employed to fix, maintain, or operate portions of one subsystem, e.g., subsystem 400A. However, fixing one subsystem controllers 308, 310, 312 may or may not call for information about the operation of another subsystem controller 308, 310, 312. Thus, the firewalls 1202, 1204, 1206 may manage the accessibility of information as among the subsystem controllers 308, 310, 312, e.g., using credentials, or other access-management devices.

If the determination at 1304 is that the data should not be accessed, the method 1300 may move to blocking the request 1306. Otherwise, the method 1300 may transmit the request from the firewall 1202, 1204, 1206 to the rig control system 302, e.g., to the unit 320 and/or to the appropriate supervisor controller.

Figure 14:
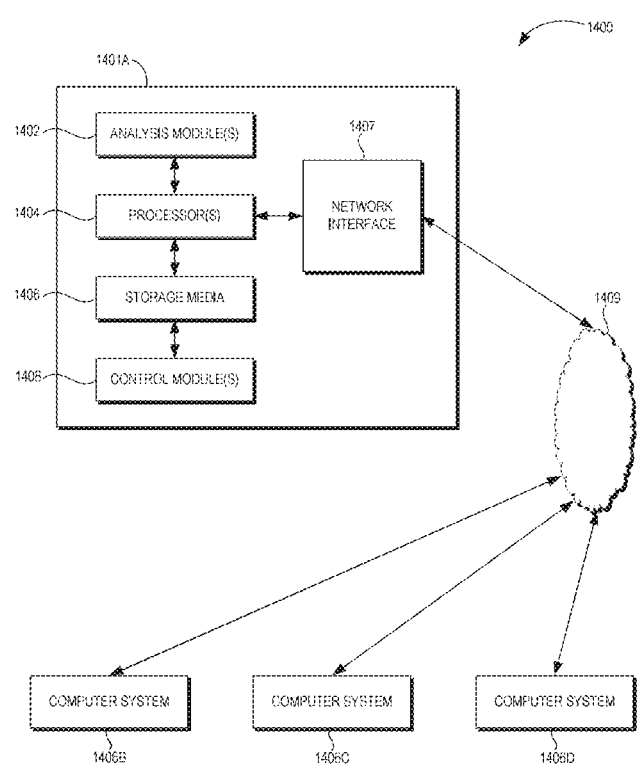
FIG. 14 illustrates a schematic view of a computing system, according to an embodiment.

In some embodiments, the methods of the present disclosure may be executed by a computing system. FIG. 14 illustrates an example of such a computing system 1400, in accordance with some embodiments. The computing system 1400 may include a computer or computer system 1401A, which may be an individual computer system 1401A or an arrangement of distributed computer systems. The computer system 1401A includes one or more analysis modules 1402 that are configured to perform various tasks according to some embodiments, such as one or more methods disclosed herein. To perform these various tasks, the analysis module 1402 executes independently, or in coordination with, one or more processors 1404, which is (or are) connected to one or more storage media 1406. The processor(s) 1404 is (or are) also connected to a network interface 1407 to allow the computer system 1401A to communicate over a data network 1409 with one or more additional computer systems and/or computing systems, such as 1401B, 1401C, and/or 1401D (note that computer systems 1401B, 1401C and/or 1401D may or may not share the same architecture as computer system 1401A, and may be located in different physical locations, e.g., computer systems 1401A and 1401B may be located in a processing facility, while in communication with one or more computer systems such as 1401C and/or 1401D that are located in one or more data centers, and/or located in varying countries on different continents).

A processor may include a microprocessor, microcontroller, processor module or subsystem, programmable integrated circuit, programmable gate array, or another control or computing device.

The storage media 1406 may be implemented as one or more computer-readable or machine-readable storage media. Note that while in the example embodiment of FIG. 14 storage media 1406 is depicted as within computer system 1401A, in some embodiments, storage media 1406 may be distributed within and/or across multiple internal and/or external enclosures of computing system 1401A and/or additional computing systems. Storage media 1406 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or alternatively, may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, the computing system 1400 contains one or more rig control module(s) 1408. In the example of computing system 1400, computer system 1401A includes the rig control module 1408. In some embodiments, a single rig control module may be used to perform some or all aspects of one or more embodiments of the methods disclosed herein. In alternate embodiments, a plurality of rig control modules may be used to perform some or all aspects of methods herein.

It should be appreciated that computing system 1400 is only one example of a computing system, and that computing system 1400 may have more or fewer components than shown, may combine additional components not depicted in the example embodiment of FIG. 14, and/or computing system 1400 may have a different configuration or arrangement of the components depicted in FIG. 14. The various components shown in FIG. 14 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to explain at least some of the principals of the disclosure and their practical applications, to thereby enable others skilled in the art to utilize the disclosed methods and systems and various embodiments with various modifications as are suited to the particular use contemplated.

What is claimed is:

1. A system for controlling a drilling rig, comprising:
a plurality of first controllers each configured to control an operating parameter of a respective rig subsystem of a plurality of rig subsystems of the drilling rig and to receive sensor data therefrom, wherein the plurality of first controllers are configured to provide a feedback loop for executing a command related to the operating parameter;
a second controller configured to receive sensor data from the plurality of first controllers and to coordinate control of the plurality of rig subsystems; and
a process network configured to execute a process application, wherein the process network is configured to generate one or more task-based commands based on the execution of the process application and to transmit the one or more task-based commands to the second controller.

2. The system of claim 1, further comprising an interface between the process network and the second controller, wherein the interface is configured to log data received from the process network, or to log data related to the operation of the second controller, or both, such that the interface is configured to provide forensic data.

3. The system of claim 1, wherein the second controller is configured to determine one or more parameter-based commands from the one or more task-based commands, and coordinate execution of the parameter-based commands among the plurality of rig subsystems.

4. A method for controlling a drilling rig, comprising:
controlling operating parameters of a plurality of rig subsystems using a plurality of subsystem controllers in a first layer, wherein each of the plurality of subsystem controllers controls one of the plurality of rig subsystems independently of the others of the plurality of subsystem controllers;
generating feedback information using the first layer, based on the operation of the plurality of rig subsystems;
receiving the feedback information from the first layer, at a second layer;
coordinating operation of the plurality of rig subsystems using the second layer; and
executing a well planning application, a well simulation application, a simulation application, or a combination thereof, using a process network of a third layer, to generate one or more task-based commands;
transmitting the one or more task-based commands to the second layer;
generating one or more parameter-based commands based on the one or more task-based commands received from the third layer, using the second layer; and
transmitting the one or more parameter-based commands to the plurality of subsystem controllers of the first layer.

5. The method of claim 4, further comprising:
providing a clock by operation of the second layer, the third layer, or both; and
applying a uniform timestamp to the feedback information generated at the first layer.

* * * * *